L. DE VITO.
BRAKE FOR RAILROAD CARS.
APPLICATION FILED OCT. 6, 1910.
1,008,795.
Patented Nov. 14, 1911.
2 SHEETS—SHEET 2.
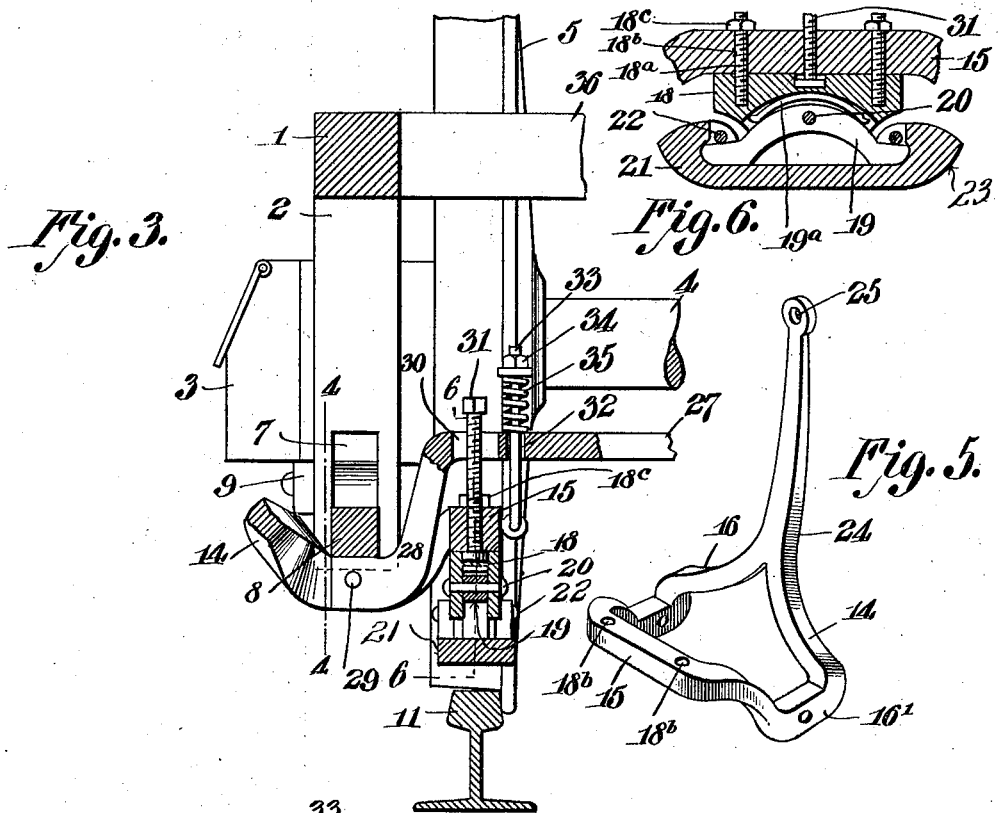
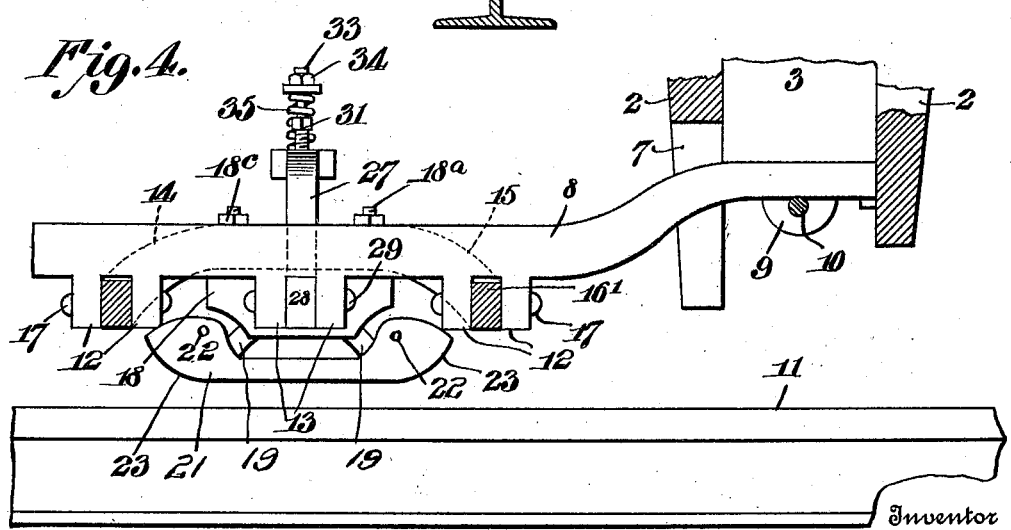
Witnesses
Inventor
Louis DeVito,
By Victor J. Evans.
Attorney

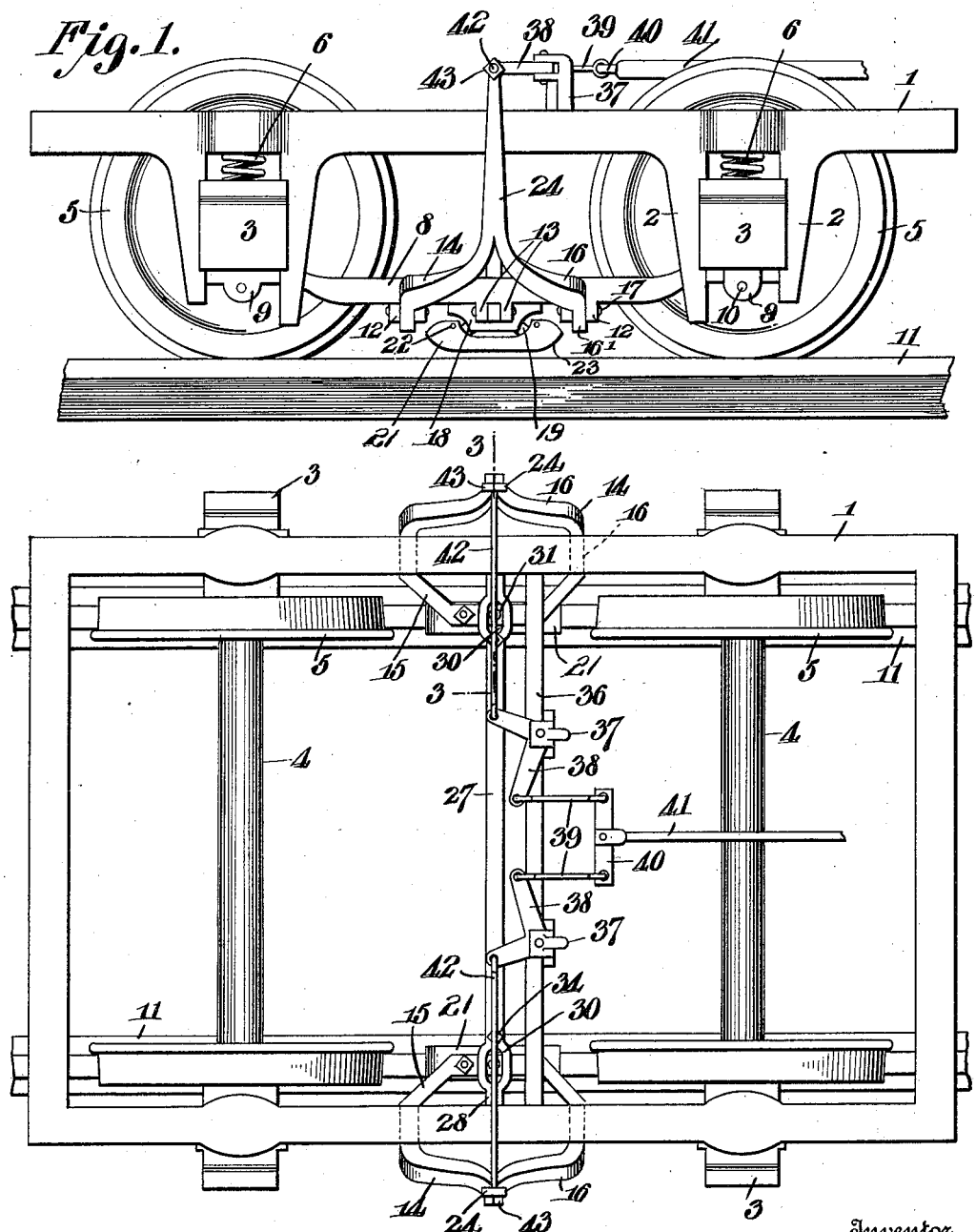

UNITED STATES PATENT OFFICE.

LOUIS DE VITO, OF CLEVELAND, OHIO.

BRAKE FOR RAILROAD-CARS.

1,008,795.  Specification of Letters Patent.  Patented Nov. 14, 1911.

Application filed October 6, 1910. Serial No. 585,655.

*To all whom it may concern:*

Be it known that I, LOUIS DE VITO, a citizen of the United States, residing at Cleveland, in the county of Cuyahoga and State of Ohio, have invented new and useful Improvements in Brakes for Railroad-Cars, of which the following is a specification.

This invention relates to brakes for railroad cars, the object of the invention being to provide a simple and comparatively inexpensive construction of brake gear in which the brake shoes are adapted to be thrown into contact with and operate upon the track rails, and in which provision is made for a proper yielding action of the brake shoes to accommodate themselves to irregularities in the surfaces of the rails and for the prompt retraction of the brake shoes upon the relaxation of the brake gearing to prevent injury to the parts of the brake mechanism.

A further object of the invention is to provide a track brake which may be substituted for the wheel brake in common use and applied to the trucks of cars without the necessity of varying the construction of the general brake mechanism.

The invention consists of the features of construction, combination and arrangement of parts, hereinafter fully described and claimed, reference being had to the accompanying drawings, in which:—

Figure 1 is a side elevation, showing the application of my invention to a car truck. Fig. 2 is a top plan view of the same. Fig. 3 is a vertical cross section on the line 3—3 of Fig. 2. Fig. 4 is a detail section on the line 4—4 of Fig. 3. Fig. 5 is a view of one of the yokes and lever arms detached. Fig. 6 is a longitudinal section through one of the brake shoes and its holder, taken on the plane indicated by line 6—6 of Fig. 3.

Referring to the drawings, 1 designates the frame of a car truck of ordinary construction, the side bars of which are provided with depending guides 2 in which are slidably mounted the bearing boxes 3 in which the spindles of the axles 4 carrying the wheels 5 are journaled in the usual way, the boxes being arranged to bear upon the truck frame supporting springs 6 in the customary manner. The inner members of the guides 2 at each side of the truck are vertically slotted, as at 7, for the passage of the ends of a longitudinally extending suspension bar 8, which ends of said bars extend between spaced lugs 9 formed on the under side of the boxes 3 and are confined therein by retaining pins 10 passing through said lugs. The suspension bars support the brake shoes and their carrier members and are thus fixed with relation to the track rails 11 to always hold the brake shoes at a desired elevation above said rails. Each suspension bar is provided with two sets of spaced lugs 12 and a central set of spaced lugs 13, the lugs of each of said sets being arranged in pairs. Upon each bar is pivotally mounted a yoke 14, consisting of inner and outer portions 15 and 16, said portions being connected by intermediate webs 16' which are pivotally mounted in the spaces between the sets of lugs 12 on pivot pins 17 carried by said lugs, thus permitting the yokes to swing laterally of the truck in a vertical plane.

The inner member of each yoke has bolted or otherwise secured thereto a holder 18 supporting a carrier or balancing bar 19, said bar being pivotally connected with the holder by a cross pin or bolt 20. The center of the bar is arched to fit within a cavity in the base of the holder, while the ends of the bar are straight and seat in sockets in the ends of the brake shoe 21, in which they are held by cross pins or bolts 22, by which construction the shoe is detachably connected with the bar and permitted to have pivotal movement in a vertical plane on the pin 20 to ride over any inequalities in the surface of the track rail without injury, the ends of the shoe being beveled, as at 23, to adapt the shoe to ride over such inequalities of surface. The bar 19 is balanced by a bowed spring 19ª seated in the cavity in the holder, which spring tends to hold the brake shoe horizontal to bear squarely against the rails, while at the same time permitting the shoe to yield for the above stated purpose.

Bolts 18ª are fixed in the holder 18 and extend upward through openings 18ᵇ in the portion 15 of the yoke, each bolt being provided at its top with a nut 18ᶜ to rest on the portion 15. The outer member of the yoke is provided with an upwardly extending lever arm 24 formed at its upper end with an aperture or eye 25 for a purpose hereinafter described.

Extending between the longitudinal suspending bars at the opposite sides of the truck is a transverse suspending bar 27, said bar having downwardly attaching ends 28 which fit between the lugs 13 on the longitudinal suspension bars and are secured thereto by pins or bolts 29. Adjacent its downbent ends the transverse suspension bar is provided above the inner members 15 of the respective yokes with elongated apertures or eyes 30 to receive adjusting bolts 31 extending upwardly from said members of the yokes which openings permit the swinging movements of the yoke. Each bolt 31 works in a threaded opening in the part 15 and is swiveled at its lower end in the holder 18, so that upon relaxing the nuts 18ᶜ and turning the bolt 31 the holder may be moved downward to adjust the brake shoe to compensate for wear. The transverse bar is also provided at a point inwardly of each eye or aperture with an opening 32 for the passage of a link bolt 33, said bolt being pivotally connected at its lower end with the yoke and provided at its upper end with a nut 34. Surrounding the upwardly projecting end of the link bolt between the bar and nut or head is the coiled spring 35, which normally operates to hold the inner member of the yoke elevated off the surface of the rail, the link bolt and spring forming a yielding connection to permit free pivotal movement of the yoke under the action of the operating gear to throw the brake shoe into and out of action.

A bar 36 extends between the sides of the truck frame and is provided with bracket arms 37 supporting laterally swinging bell crank levers 38, the inner arms of which levers are connected by links 39 with a floating lever 40 connected with the adjacent end of the brake rod 41, which rod may be operated by the usual or any preferred type of brake gearing to actuate the brake shoes. The outer arms of the bell crank levers have pivotally connected therewith the inner ends of transmission rods 42, the outer ends of which pass loosely through the eyes or apertures in the upper ends of the lever arms 24 so as to permit of a prescribed movement of the brake rod for transmitting motion to the yokes. The outer ends of the transmission rods carry contact members 43, which, when the brake rod moves to the prescribed extent engage the lever arms and swing the same inwardly whereby the inner members of the yokes will be swung downwardly to force the brake shoes into engagement with the track rails. The sliding connection between the transmission rods and the lever arms permits the yokes to have a certain amount of independent rocking play or pivotal connection to prevent the too rapid engagement of the brake shoes with the rails, and to prevent injury to the yokes in the oscillation of the brake shoes upon their pivots as they ride over inequalities in the surface of the rails.

From the foregoing description, it will be seen that my invention provides a construction of track brake which may be mounted upon an ordinary form of truck without material changes in the construction thereof, and that through the action of the brake shoes upon the rails a powerful braking pressure may be obtained, without liability of injury to the parts of the brake gear, the described mode of application preventing excess wear upon the wheels and liability of flattening of the wheels caused by the wheel engaging brake shoes of ordinary construction. It will also be seen that the invention may be applied at a cost not exceeding the cost of application of brake gearing of the ordinary type.

Having thus described the invention, what is claimed as new, is:—

1. In a brake of the character described, the combination of a truck, carrier members pivoted to swing vertically at the sides of the truck, means for simultaneously swinging said carrier members, brake shoes yieldingly mounted upon said carrier members, means for adjusting the brake shoes, and means for normally holding the carrier members yieldingly retracted.

2. In a brake of the character described, the combination of a truck, longitudinal suspension bars at the sides of the truck, yokes pivotally mounted to swing in a vertical plane upon said bars, a cross bar extending between the longitudinal bars, lever arms connected with the outer portions of the yokes, guiding connections between the transverse bar and the inner portion of the yokes, brake shoes carried by said inner portions of the yokes, operating means connected with the lever arms, and connections between the yokes and transverse bar for holding said yokes and brake shoes yieldingly retracted.

3. In a brake of the character described, the combination of a brake frame, longitudinally extending suspension bars at the sides of the truck frame, yokes pivotally mounted upon said suspension bars to swing in a vertical plane, lever arms connected with the outer members of the yokes, holders adjustably mounted upon the inner members of the yokes, carriers pivotally mounted on the holders, brake shoes held by the carriers, springs acting on the carriers to dispose the shoes parallel with the rails, a transverse bar extending between the longitudinal suspension bars, spring connections between the inner members of the yokes and the transverse bar to normally hold the yokes retracted, levers mounted upon the truck, a brake rod connected with said levers, and connecting rods between the levers and the lever arms of the yokes.

In testimony whereof I affix my signature in presence of two witnesses.

LOUIS DE VITO.

Witnesses:
V. CAMPANELLO,
ANGELO VETA.

Copies of this patent may be obtained for five cents each, by addressing the "Commissioner of Patents, Washington, D. C."